(12) United States Patent
Sharma et al.

(10) Patent No.: US 8,423,086 B1
(45) Date of Patent: Apr. 16, 2013

(54) SERVICE SUMMARY INDICATOR

(75) Inventors: Sanjay K. Sharma, Olathe, KS (US);
Woojae Lee, Manhattan, KS (US);
Pujan K. Roka, Olathe, KS (US); Brian J. Finnerty, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 733 days.

(21) Appl. No.: 11/870,973

(22) Filed: Oct. 11, 2007

(51) Int. Cl.
*H04B 1/38* (2006.01)

(52) U.S. Cl.
USPC ........... 455/566; 455/572; 455/573; 455/574; 455/418; 455/343.1

(58) Field of Classification Search .................. 455/566, 455/573, 572, 574, 343.1, 343.2, 343.3, 418
See application file for complete search history.

(56) References Cited

U.S. PATENT DOCUMENTS

| | | | | |
|---|---|---|---|---|
| 6,021,313 | A * | 2/2000 | Koga | 340/7.56 |
| 6,546,263 | B1 * | 4/2003 | Petty et al. | 455/566 |
| 7,486,970 | B2 * | 2/2009 | Kim et al. | 455/566 |
| 7,555,717 | B2 * | 6/2009 | Seo et al. | 715/706 |
| 7,589,726 | B2 * | 9/2009 | Aholainen et al. | 345/440 |
| 2007/0123286 | A1 * | 5/2007 | Mock et al. | 455/518 |
| 2007/0142094 | A1 * | 6/2007 | Enns et al. | 455/566 |

* cited by examiner

Primary Examiner — Kamran Afshar
Assistant Examiner — Sayed T Zewari

(57) ABSTRACT

A method, system, and computer-readable storage media is provided for consolidating an operating status of a mobile device. APIs and applications operate in the mobile device to collect various data associated with the operation of the mobile device. The mobile device can be configured by a user or a service provider system to determine which data to collect. The collected data is consolidated through calculations resulting in a single value or variable that indicates the operating health of the mobile device. A visual representation of the single value or variable is provided in a display at the mobile device to illustrate the health of the mobile device to the user.

20 Claims, 4 Drawing Sheets

US 8,423,086 B1

SERVICE SUMMARY INDICATOR

CROSS-REFERENCE TO RELATED APPLICATIONS

Not applicable.

STATEMENT REGARDING FEDERALLY SPONSORED RESEARCH OR DEVELOPMENT

Not applicable.

SUMMARY OF THE INVENTION

The present invention generally relates to providing a summary indicator about the operating health of a mobile device. Various data surrounding the operating condition of the mobile device may be collected and analyzed. The collected and analyzed data may be consolidated through various calculations into a consolidated status.

In a first aspect, a method for consolidating an operation status of a mobile device into a single view is provided that includes collecting sets of information related to an operation of the mobile device. The sets of information are consolidated into a variable. The variable represents a consolidated status of the mobile device. A visual representation is provided of the variable at a display at the mobile device.

In another aspect, a system to provide a consolidated operating status of a mobile device is provided that includes a processor, a memory, and a display connected together in the mobile device. The processor operates to initiate and receive an information. The processor operates application programming interfaces that access different operational data related to the mobile device. The processor operates applications to read the different operational data from either or both the application programming interfaces and the memory. The memory operates to store the different operational data. The applications operate to consolidate the different operational data into a single representation that indicates an operational health of the mobile device. The display operates to show the single representation.

In yet another aspect, computer-readable storage media having computer instructions embodied thereon for performing a method for consolidating an operation status of a mobile device into a single view is provided that includes collecting sets of information related to an operation of the mobile device. The sets of information are consolidated into a consolidated status of the mobile device. A visual representation of the consolidated status is provided at a display at the mobile device.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention provides a method, system and computer-readable storage media for consolidating an operation status of a mobile device. In an embodiment, a summary indicator is created illustrating the operating health of a mobile device. Various data surrounding the operating condition of the mobile device is collected and analyzed. The collected and analyzed data may be consolidated through various calculations into a consolidated status.

Having briefly described an embodiment of the present invention, an exemplary operating environment for the present invention is described below.

Exemplary Operating Environment

The present invention operates in a computing device environment. In particular, a mobile device is used to implement the present invention to provide a consolidated status about the mobile device. The mobile device is a computing device and includes components such as a processor, memory, and a display. Other components may be found in the computing device and, more specifically, the mobile device may include components, not mentioned here, related to its particular function. Typically, the mobile device includes devices such as cellular telephones, personal digital assistants (PDAs), short message service (SMS) devices, smart phones, handheld computers, and other wireless devices.

Along with the description of the mobile devices above, the present invention is implemented with various software programs. The software programs operate on the mobile devices and may be found in the form of applications, application programming interfaces (APIs), and operating systems.

Service Summary Indicator

As previously mentioned, the present invention generally relates to providing a summary indicator about the operating health of a mobile device. Various data surrounding the operating condition of the mobile device may be collected and analyzed. The collected and analyzed data may be consolidated through various calculations into a consolidated status which can be provided in a visual representation.

Figure 1:
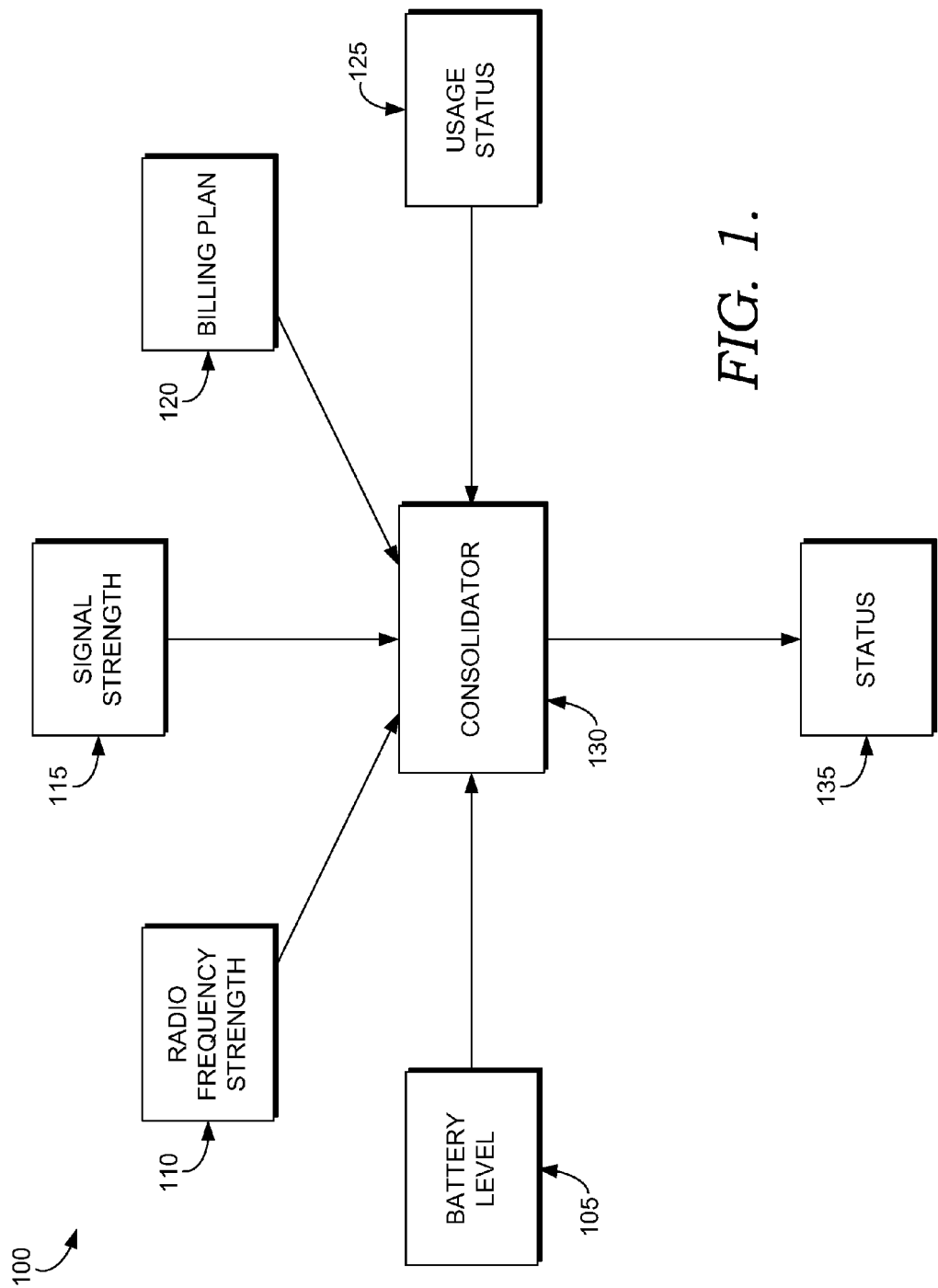
FIG. 1 is a block diagram of an exemplary operating environment illustrating an implementation of an embodiment of the present invention.

In FIG. 1, a block diagram of an exemplary operating environment 100 is shown. Environment 100 operates with a battery level 105, a radio frequency (RF) strength 110, a signal strength 115, a billing plan 120, and a usage states 125. Collectively, battery level 105, RF strength 110, signal strength 115, billing plan 120, and usage status 125 may be referred to as the set of operating data. As environment 100 is an exemplary operating environment, the set of operating data is exemplary and may include other data not mentioned here. Other data may be used in other implementations of embodiments of the present invention.

The set of operating data along with other data may be termed as services awareness. For example, billing plan 120 and/or usage status 125 can be based on the user's data plan and usage subscription status. In a scenario, the user might have used 2.05 megabits of data at a cost of sixty dollars. In some cases, the user now has to pay premium rates because they have exceeded a certain limit. Hence, usage status 125 may be recorded as being low or bad. Or, the user may have an unlimited data plan. In this case, usage status 125 may be recorded as being high or good. RF strength 110 may provide a status such as roaming status. Signal strength 115 can provide information on quality.

Service awareness includes being aware of a user's service plan such as specific quality of service (QoS) rates in a subscription. Service awareness can include monitoring background data processing such as a listener type of applications or background SMS. Service awareness may also include logging or diagnostics for any application running in the foreground. Even further, service awareness may include any connectivity lags in real-time or near real-time such as the lag between two instant messages.

The set of operating data that exists is broad, and not only describes the particular items mentioned above but also describes the flow of information back and forth into the mobile device and other systems not shown. For example, radio frequency strength 110 represents the data that flows into the mobile device and also represents the data related to it in the mobile device.

As shown in FIG. 1, battery level 105, RF strength 110, signal strength 115, billing plan 120, and usage status 125 may be collected and provided to consolidator 130. Consolidator 130 exists in various forms depending on the implementation of the embodiment of the present invention. Consolidator 130 may be an aggregator of the data that comes to it. It may also be an algorithm that performs one or more calculations based on the data that is provided to it. Consolidator 130 can exist as part of a processor or can be a standalone applications that operates with other software.

The output of consolidator 130 may be provided as a status 135. Status 135 can represent a consolidated status that is created as a result of the efforts of consolidator 130. Also, status 135 may be a visual representation of the output of consolidator 130. For example, the set of operating data may be manipulated by consolidator 130 to provide a single result. This single result may, in turn, correlate to a set of visual representations that can be displayed. The result may be provided in the form of a picture, a graph, a set of colors, or a text. As the result changes, the corresponding visual representation also changes.

The set of operating data is dynamic as to which type is used in an embodiment. Not all of the set of operating data needs to be provided to consolidator 130. For example, in one embodiment, a user or a system may configure the mobile device to collect information related to battery level 105 and signal strength 115. This configuration would allow consolidator 130 to receive or read information related to battery level 105 and signal strength 115 to provide status 135. In another embodiment, the user or the system may configure the mobile device to collect information related to RF strength 110 and usage status 125. Again, consolidator 130 can manipulate the operating data to provide status 135.

Figure 2:
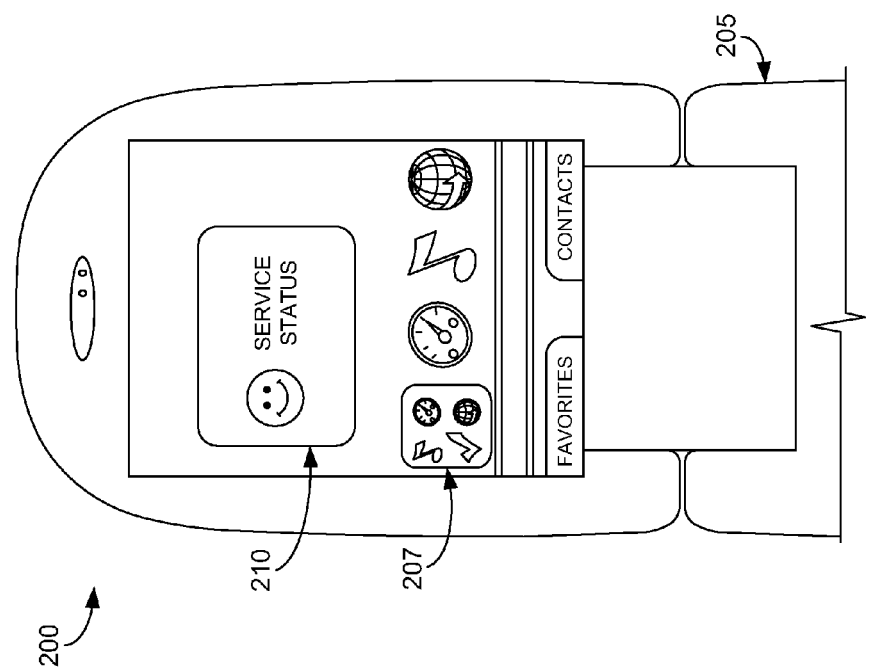
FIG. 2 is an illustration of an exemplary display of a mobile device operating an implementation of an embodiment of the present invention.

Turning now to FIG. 2, an exemplary display 200 of a mobile device 205 is shown with a display 207 and a service status 210. Display 207 is a screen display that may be found in various handheld devices such as mobile phones, PDAs, SMS devices, and handheld computers. Display 207 provides visual information for a user to interact with mobile device 205. Typically, display 207 may illustrate a set of graphical icons or other text information which allows a user to interact with the mobile device. This interaction may include the user providing input to the mobile device using a set of keys with the keystrokes shown through the visual representation on display 207. This interaction may also include the user receiving visual information from the mobile device at display 207.

A set of visual information may be received from display 207. The type of visual information is extensive and can be dynamic depending on a number of factors related to the operation of mobile device 205. Display 207 functions as the primary visual interface for mobile device 205. For example, the user can manipulate various functions related to mobile device 205 using display 207. In some embodiments, display 207 may accept inputs and provide the visual information. In other embodiments as mentioned earlier, display 207 may provide the visual information based on inputs provided at a keyboard or a set of keys located elsewhere.

With an implementation of an embodiment of the present invention, service status 210 can be seen on display 207. Service status 210 illustrates an operation status of mobile device 205. In this case, service status 210 shows a smiling face which would indicate a good operating condition of mobile device 205. The smiling face is a single visual reference that can correspond to a variety of factors underlying the pictorial representation. As discussed above, mobile device 205 may include a configuration that considers several data inputs related to the operation of mobile device 205. The goal of the present invention is to prevent the user from locating each operating aspect of mobile device 205 to determine its operation health. Rather than locate battery level 105, determine RF strength 110, or monitor usage status 125, the user can view one visual representation in the form of service status 210. The underlying calculations and consolidations are performed automatically in the background to improve the user's experience and ease of use with mobile device 205.

Figure 3:
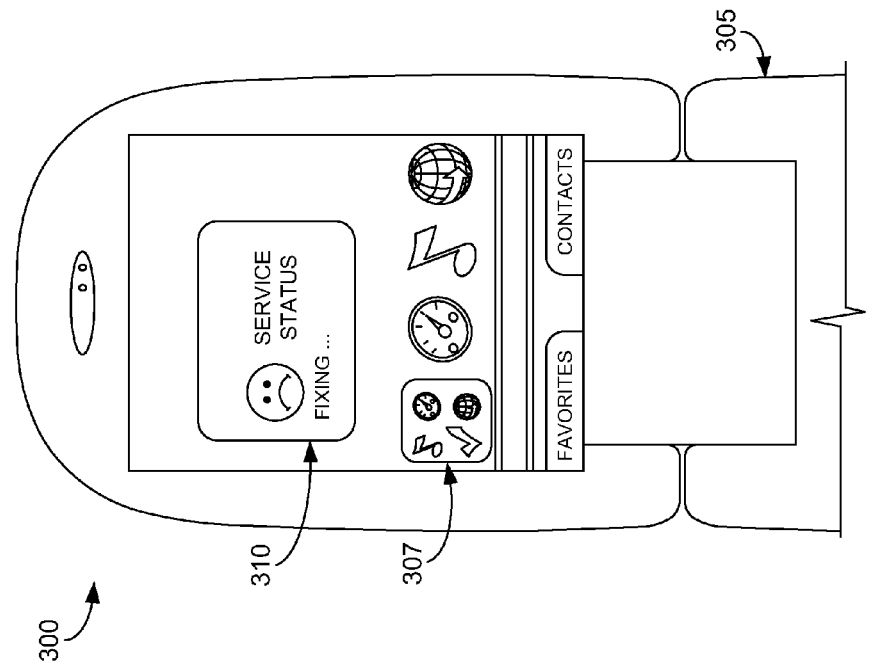
FIG. 3 is another illustration of an exemplary display of a mobile device operating an implementation of an embodiment of the present invention.

In FIG. 3, another exemplary display 300 of a mobile device 305 is shown implementing an embodiment of the present invention. Exemplary display 300 and mobile device 305 are similar to exemplary display 200 and mobile device 205. Mobile device 305 includes a display 307 which is similar to display 207. As shown in FIG. 3, a service status 310 shows a sad face indicating a problem with the operation health of mobile device 305. Service status 310 provides a quick reference about one or more problems that may exist in mobile device 305. The user is provided quick visual information about mobile device 305 without having to search for a variety of information.

The list of things that can go wrong with mobile device 305 can vary tremendously. Service statuses 210 and 310 provide quick references to the user to obtain instant information regarding the health of the mobile device. The way in which the user obtains service statuses 210 and 310 can vary according to an implementation of the embodiment of the present invention. For example, the embodiment can be implemented to automatically provide a service status on a periodic basis. The user can configure the mobile device to provide a service status on the display every three (3) hours or some other time period. Another embodiment can be implemented where the user configures the mobile device to provide a service status only when there is a problem, such as service status 310. In this embodiment, the mobile device can be configured such that a periodic calculation occurs in the background without the user knowing about the calculation at consolidator 130. If the result indicates service status 210, no action is taken and the result is treated as a normal operation. However, if the result indicates service status 310, service status 310 is shown on display 307 notifying the user of an abnormal operating condition of the mobile device. If desired further, the user can obtain details behind the calculations to pinpoint the cause of the abnormal operating condition indicated by service status 310.

In other implementations of embodiments of the present invention, status 135 which is shown above at service statuses 210 and 310 may be illustrated in other forms at displays 207 and 307. For example, rather than a smiley face or a sad face, service statuses 210 and 310 can also be a graph, a set of colors or a text. The graph can provide an indicator with a set of reference markings identifying the operating health of the mobile device. In another embodiment, colors may be used to indicate the operating health. The color green may be used to indicate a good or normal operating condition. The color yellow may be used to indicate a warning condition. The color red may be used to indicate a bad or harmful operating condition. The color red may also be used to indicate no service for the mobile device. Finally, text may be used to provide detailed information to the user. Text can also be used to pinpoint the source of a problem. Although various service statuses are discussed, the list of the types of services statuses that may be provided at displays 207 and 307 is not exhaustive and may include others not listed here. The common aspect of the service statuses is that they are derived based on a consolidation of operating data. The service statuses can be created based on the output from consolidator 130 or based on a variable that is created as the result of consolidator 130.

An implementer of an embodiment of the present invention may vary the information indicated by status 135 and service statuses 210 and 310. Service indication from status 135 and service statuses 210 and 310 can also include and be the following: a simple indicator to notify the user of the quality and status of service; a data miner of the mobile device's logs which derive user-decipherable indicators; an indicator of logs or data that are delivered to back-office systems for analysis or archiving; or an indicator with a real-time interface between a customer care organization and the mobile device to check service status. In addition, status 135 and service statuses 210 and 310 may provide service indications for an impact of certain service types such as roaming and not receiving certain data feed. Status 135 and service statuses 210 and 310 may provide service indications of corrective measures. For example, a message can be received that states due to high traffic, the user's text message will be queued and delivered within approximately five minutes.

Figure 4:
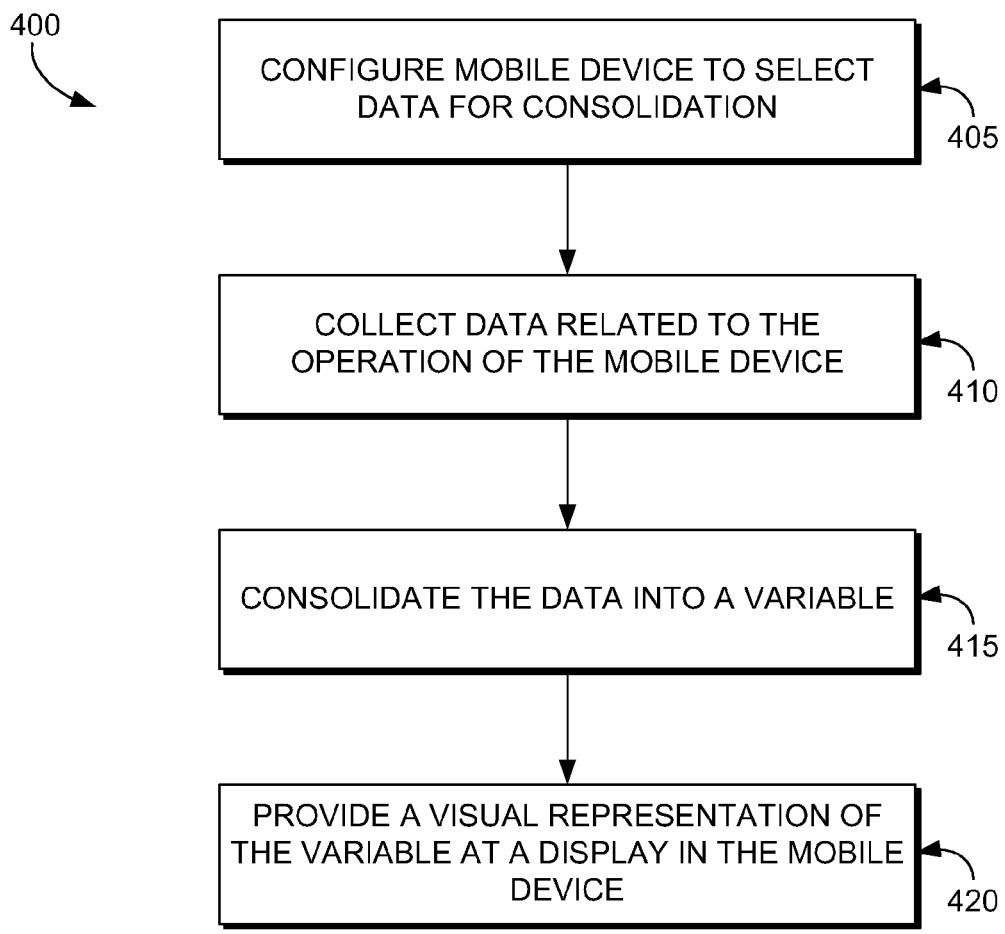
FIG. 4 is an exemplary process for consolidating an operation status of a mobile device.

Turning now to FIG. 4, an exemplary process for consolidating an operation status of mobile devices 205 and 305 is shown in a method 400. In a step 405, mobile devices 205 and 305 are configured to select data for consolidation. This data is similar to battery level 105, RF strength 110, signal strength 115, billing plan 120, and usage status 125. This data was identified earlier as the set of operating data. At least two or more of these data items are selected for consolidation. In a step 410, the selected data items are collected and stored at the mobile device. Typically, these data items relate to the operation of mobile devices 205 and 305. In a step 415, consolidator 130 consolidates the data items into a variable. This step takes a multitude of information and aggregates or calculates a single variable which acts as an indicator of the operation health of mobile devices 205 and 305. In a step 420, a visual representation of the variable is provided at displays 207 and 307 respectively in mobile devices 205 and 305. The visual representations are service statuses 210 and 310, or other variations such as a graph, set of colors, or text.

Figure 5:
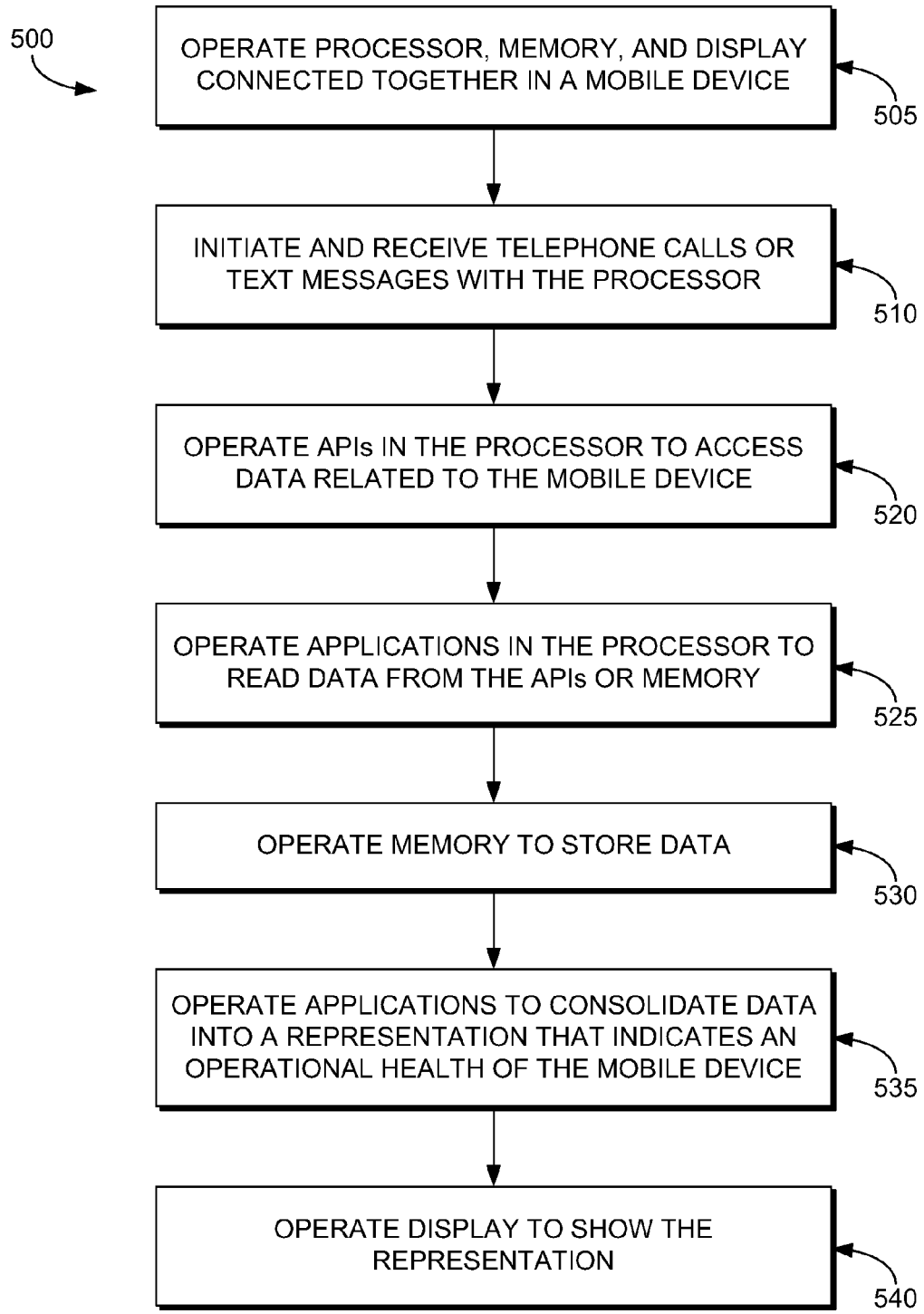
FIG. 5 is an exemplary process for operating a system to consolidate an operating status of a mobile device.

In FIG. 5, an exemplary process for operating a system to consolidate an operating status of mobile devices 205 and 305 is shown in a method 500. In a step 505, mobile devices 205 and 305 operate a processor, memory and a display connected together in their respective devices. In a step 510, the processor in mobile devices 205 and 305 can initiate and receive either telephone calls or text messages. In a step 520, the processor can operate APIs to access operating data related to mobile devices 205 and 305. In a step 525, the processor can also operate applications to read data from the APIs running in the processor or from memory. In a step 530, the memory stores data which may be accessed by the processor. In a step 535, applications operate to consolidate (consolidator 130) data into a representation that indicates an operational health of mobile devices 205 and 305. The representation can be status 135 or service statuses 210 and 310. In a step 540, the display operates to show the representation. The display can be displays 207 and 307.

The steps identified in FIGS. 4 and 5 may be executed without regard to order. Some of the steps are coupled together but this is merely exemplary to illustrate the embodiment of the present invention. For example, step 410 may be executed before step 405. Step 525 may be executed before step 520.

When mobile device 305 encounters a problem that is detected and illustrated with service status 310, mobile device 305 may be configured to perform a self-analysis to identify the particular problem. In addition, mobile device 305 may be configured to fix the problem with little or no user interaction. For example, a problem with the battery level could tell the user with service status 310 to recharge the battery. Or, additional information could tell the user that the user is approaching or exceeding limits imposed by the user's billing plan. If the user has a fixed number of "talk minutes" for the mobile device, an implementation of an embodiment of the present invention can provide information related to the user's usage of the mobile device.

As discussed above, various implementations of the present invention can use the service statuses and other information to provide solutions to the user's problems with the mobile device. Some of the problems can be resolved automatically while others may require manual intervention by the user or the service provider's system. A user's manual intervention would be in the form of physically charging the devices' battery while a system's manual intervention would be in the form of boosting the signal strength either at the mobile device or another network device. The system could also modify signaling connections to make improvements, such as transferring communication between mobile device and network device A to mobile device and network device B.

In continuing the discussion of self-analysis and resolution of problems, the user of the mobile device could interact with a customer care organization to fix problems once the user receive a service status like service status 310. For example, in the case of service disruption, the user could chat with the customer care organization using instant messaging, text messaging, or high performance push to talk (HPPTT) which is a version of QCHAT developed by Qualcomm Incorporated of San Diego, Calif. The customer care representative can push a message to the mobile device such as the following: "Hi I am your customer care help. You seem to be roaming. Please be aware that you may incur higher charge on the usage of this service while roaming on a different network."

Implementations of embodiments of the present invention can provide a basis for cross selling of new features and services. For example, service status dispatches from the mobile device can alert a sales team that a customer is using a low-horsepower mobile device to play high-speed games. In a scenario, the sales team can send a message to the user about a better mobile device that may be suited or more compatible for the games that are played. Or, another scenario may involve the user that travels extensively. The sales team can send a message about a better phone service plan that might include nationwide roaming or might include mobile device features with international capability.

One skilled in the art will appreciate that methods and systems in accordance with the present invention may be implemented using computer software. Such software may take the form of computer-readable code embodied on one or more computer-readable media. Software implementing the present invention may operate independently, but may also be incorporated with other software or vendor programs. Various software languages may be used to implement methods and systems in accordance with the present invention.

The invention claimed is:

1. A method for consolidating an operation status of a mobile device into a single view, comprising:
   collecting a battery level, a radio frequency, a signal strength, and a usage status related to an operation of the mobile device;
   providing the battery level, the radio frequency, the signal strength, and the usage status to an algorithm in the mobile device, wherein the algorithm aggregates or performs a calculation;
   combining, by the algorithm, the battery level, the radio frequency, the signal strength, and the usage status into a single value, wherein the single value is represented by a parameter and represents a consolidated status of the mobile device; and
   providing, from the consolidator, a visual representation of the parameter at a display at the mobile device.

2. The method of claim 1, further comprising configuring the mobile device to use the battery level, the radio frequency, the signal strength, and the usage status.

3. The method of claim 2, wherein configuring the mobile device comprises receiving an input from a user or receiving an input from a system.

4. The method of claim 2, wherein configuring the mobile device comprises establishing a set of default values.

5. The method of claim 2, wherein combining the battery level, the radio frequency, the signal strength, and the usage status comprises:
   assigning a weight to a subset of the battery level, the radio frequency, the signal strength, and the usage status based on a set of rules; and
   calculating, from the weighted subset and a remainder of the battery level, the radio frequency, the signal strength, and the usage status, the single value.

6. The method of claim 1, wherein providing the visual representation of the parameter comprises providing a picture, a graph, a set of colors, or a text of the variable.

7. The method of claim 6, wherein the picture is selected from a group including a facial expression wherein the facial expression includes at least one of a smile associated with a normal operating condition of the mobile device and a sad expression associated with a abnormal operating condition of the mobile device.

8. A system to provide a consolidated operating status of a mobile device, comprising:
   a processor, a memory, and a display connected together in the mobile device;
   the processor operable to initiate and receive an information, to operate a set of application programming interfaces that access different operational data related to the mobile device wherein the different operational data comprise a battery level, a radio frequency, a signal strength, and a usage status, and to operate one or more applications to read the different operational data from at least one of the set of application programming interfaces and the memory;
   the memory operable to store the different operational data;
   the one or more applications include an algorithm that aggregates and performs a calculation;
   the algorithm operable to combine the different operational data into a single value represented by a parameter that indicates an operational health of the mobile device; and
   the display operable to show the parameter.

9. The system of claim 8, wherein the information is selected from a group including telephone calls or text messages.

10. The system of claim 8, wherein the parameter is selected from a group including a picture, a graph, a set of colors, and a text.

11. One or more non-transitory computer-readable storage media having computer instructions embodied thereon for performing a method for consolidating an operation status of a mobile device into a single view, the method comprising:
    collecting a battery level, a radio frequency, a signal strength, and a usage status related to an operation of the mobile device;
    providing the battery level, the radio frequency, the signal strength, and the usage status to an algorithm in the mobile device, wherein the algorithm is a set of instructions that takes input and aggregates or performs a calculation;
    combining, by the algorithm, the battery level, the radio frequency, the signal strength, and the usage status into a single value represented by a parameter of the mobile device; and
    providing, from the algorithm, a visual representation of the parameter at a display at the mobile device.

12. The non-transitory computer-readable storage media of claim 11, further comprising configuring the mobile device to use the battery level, the radio frequency, the signal strength, and the usage status.

13. The non-transitory computer-readable storage media of claim 12, wherein configuring the mobile device comprises receiving an input from a user or receiving an input from a system.

14. The non-transitory computer-readable storage media of claim 12, wherein configuring the mobile device comprises establishing a set of default values.

15. The non-transitory computer-readable storage media of claim 12, wherein combining the battery level, the radio frequency, the signal strength, and the usage status comprises:
    assigning a weight to a subset of the battery level, the radio frequency, the signal strength, and the usage status based on a set of rules; and
    calculating from the weighted subset and a remainder of the battery level, the radio frequency, the signal strength, and the usage status the single value.

16. The non-transitory computer-readable storage media of claim 11, wherein providing the visual representation of the parameter comprises providing a picture, a graph, a set of colors, or a text.

17. The non-transitory computer-readable storage media of claim 16, wherein the picture is selected from a group including a facial expression wherein the facial expression includes at least one of a smile associated with a normal operating condition of the mobile device and a sad expression associated with a abnormal operating condition of the mobile device.

18. The method of claim 1, further comprising:
    collecting a billing plan status related to an operation of the mobile device;
    providing the billing plan status to the algorithm in the mobile device; and
    combining, by the algorithm, the billing plan status with the battery level, the radio frequency, the signal strength, and the usage status into the single value.

19. The system of claim 8, further comprising the different operational data comprising a billing plan status.

20. The non-transitory computer-readable storage media of claim 11, further comprising:

collecting a billing plan status related to an operation of the mobile device;

providing the billing plan status to the algorithm in the mobile device; and combining, by the algorithm, the billing plan status with the battery level, the radio frequency, the signal strength, and the usage status into the single value.

* * * * *